United States Patent [19]

Barth

[11] Patent Number: 4,518,294
[45] Date of Patent: * May 21, 1985

[54] ROTARY FASTENER

[75] Inventor: Gerald D. Barth, So. Elgin, Ill.

[73] Assignee: Illinois Tool Works Inc., Chicago, Ill.

[*] Notice: The portion of the term of this patent subsequent to Mar. 27, 2001 has been disclaimed.

[21] Appl. No.: 359,450

[22] Filed: Mar. 18, 1982

[51] Int. Cl.³ .............................................. F16B 39/28
[52] U.S. Cl. .................................. 411/188; 411/187; 411/311; 411/399; 411/412
[58] Field of Search .............................. 411/116–118, 411/131–135, 145, 146, 160–166, 173, 174, 176, 180, 184–189, 308–311, 378, 394, 398, 399, 411–416, 386

[56] References Cited

U.S. PATENT DOCUMENTS

| | | | |
|---|---|---|---|
| 2,135,637 | 11/1938 | Gade | 411/311 |
| 2,147,209 | 2/1939 | Olson | 411/187 |
| 2,147,211 | 2/1939 | Olson | 411/187 |
| 2,959,204 | 11/1960 | Rigot | 411/186 |
| 3,286,579 | 11/1966 | Lovisek | 411/386 |
| 3,661,046 | 5/1972 | Wand et al. | 411/369 |
| 3,752,203 | 8/1973 | Hill, Jr. | 411/185 |
| 3,812,639 | 5/1974 | Sygnator | 411/311 |
| 4,223,711 | 9/1980 | Tabor | 411/188 |
| 4,310,272 | 1/1982 | Rich et al. | 411/185 |

Primary Examiner—Thomas J. Holko
Assistant Examiner—Neill Wilson
Attorney, Agent, or Firm—David I. Roche; T. W. Buckman

[57] ABSTRACT

A rotary fastener is disclosed for use in attaching the first panel to a second panel. The fastener has a head and a shank, which shank has at least one helical thread thereon. Additionally, there is at least one helical ramp extending along the shank from the underside of the head. The underside of the head has a generally annular recess which may have helical ribs therein. The fastener is dimensioned so that as it is driven into the two panels, material of the two panels is drawn up into the recess and binds on the helical ramp along the shank. Additionally, a plurality of nibs located on the underside of the head and extending into the recess "rake" up material as the underside of the head encounters the top panel, which raked material is also drawn into the recess and binds on the helical ramp. This combined binding action by panel material and raked material significantly increases stripping torque of the fastener during installation.

7 Claims, 6 Drawing Figures

ROTARY FASTENER

BACKGROUND AND BRIEF DESCRIPTION OF THE INVENTION

The present invention is directed to a rotary fastener. More particularly, the present invention is directed to a sheet metal screw for attaching two thin panels together, which screw will exhibit significantly increased stripping torque over other known sheet metal screws. With presently available sheet metal screws, the range between drive torque and strip torque is unacceptably small. For this reason, it is virtually impossible, given dimensional tolerances and variances in material, to find a single torque setting on power screw drivers which will drive the hardest to drive screw without stripping the most strippable screw. Such a situation results in a relatively high number of screws being stripped during installation which results in reduced clamp load between the two panels being secured or requires substantial operator time for removal and replacement of stripped screws. The screw of the present invention reduces the above-described problem by increasing the range between drive torque and strip torque of the screw. The sheet metal screw of the present invention has a recess in the lower side of the head surrounding the upper region of the shank and within this recess and for distance beyond the shank has formed thereon a helical ramp which may form an extension of the thread on the shank. In this regard, this screw is similar to the sheet metal screw disclosed in Applicant's pending application Ser. No. 316,260, filed Oct. 29, 1981 as a continuation-in-part of application Ser. No. 276,228, filed June 22, 1981. Additional features of the screw of the present invention include nibs on the underside of the head of the screw which traverse the outer boundary of the recess on the underside of the head of the screw. Further, the screw of the present invention includes a plurality of helical ribs, the two ends of which terminate at the outer boundary of the recess and the shank of the fastener, respectively. The height of the helical ribs decreases as the helical rib progresses from the outer boundary of the recess to the shank; the outer boundary termination point of the helical rib may coincide with an end of a nib. The purpose of the various arrangements of nibs and helical ribs disclosed herein is to "rake" up material as the underside of the head encounters the top of the first panel as the fastener is driven home and thereby provide further material to be drawn into the recess in the underside of the head to bind with the helical ramp or ramps on the shank of the fastener and, thereby, significantly increase the stripping torque of the fastener.

Other characteristics, features, and advantages of the present invention will become apparent after a reading of the following specification.

DETAILED DESCRIPTION OF THE INVENTION

Figure 1:
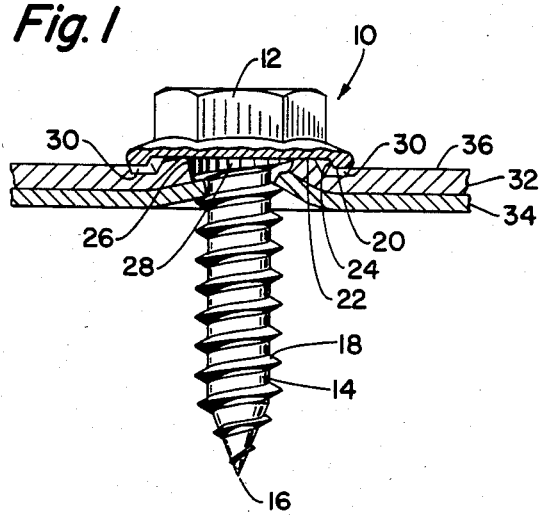
FIG. 1 is a side view in partial section of one embodiment of the fastener of the present invention illustrating the fastener as it would appear in a typical installation.

A rotary fastener as shown in FIG. 1 is comprised of a head 12 and a shank 14. The shank 14 is tapered to a point 16 and a helical thread 18 is formed on the shank 14 along substantially the entire length of the shank 14 between the point 16 and the head 12. The head 12 has an underside 20 in which is formed a recess 22 which is defined by its inner boundary at the shank 14 and an outer boundary 24, which outer boundary 24 is more clearly seen in FIG. 2. At the juncture 26 of the shank 14 and the head 12, there is formed in the shank 14 a helical ramp 28. The helical ramp 28 may circumscribe the entire circumference of the shank 14 as a single ramp or, alternatively, may be formed as a plurality of ramps; in either configuration, the ramp may, as well, circumscribe less than a full circumference of the shank 14.

Also located on the underside 20 of the head 12 are a plurality of nibs 30. In the embodiment illustrated by FIGS. 1 and 2, the nibs 30 are oriented radially with respect to the center of the head 12 and traverse the outer boundary 24 of the recess 22 in a manner whereby the nibs 30 extend into the recess 22.

Referring to FIG. 1, it can be seen that the fastener 10, when threadably advanced through a first panel 32 and a second panel 34 for the purpose of securing together those panels, as the fastener approaches full insertion the nibs 30 engage the upper surface 36 of the first panel 32. Continued advancement of the fastener 10 through the panels 32 and 34 result in engagement of the upper surface 36 of the first panel 32 by the nibs 30. As the fastener 10 advances further into the panels 32 and 34, the nibs 30 begin to "rake" up material from the upper surface 36 and, simultaneously, the panels 32 and 34 are drawn up into the recess 22. The panels 32 and 34 engage and bind upon the helical ramp 28; additionally, the material raked up by the nibs 30 is captured within the recess 22 and provides further binding action with the helical ramp 28. The cumulative effect of these various materials' binding action with the helical ramp 28 significantly increases the stripping torque of the fastener 10 without appreciably increasing the driving torque.

Figure 2:
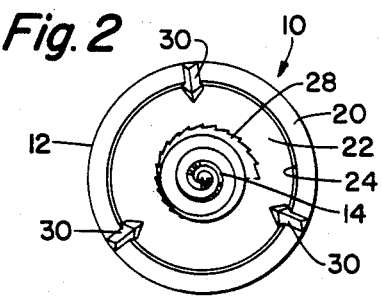
FIG. 2 is a bottom view of the fastener shown in FIG. 1.

As can be seen from FIGS. 1 and 2 the ramp 28 has a generally axially oriented surface which varies in axial length from one end of the ramp to the other. The ramp has a generally radially oriented surface which generally increases in a radial dimension from one end of the ramp to the other. It should be noted that the radially extending surface has a minimum radial extent at a point where the generally axially oriented surface of the ramp is at a maximum length.

Figure 4:
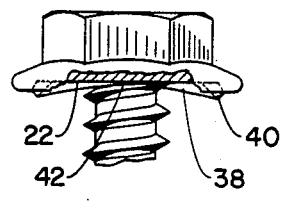
FIG. 4 is a side view of FIG. 3 in section along lines 4—4 in FIG. 3.
Figure 3:
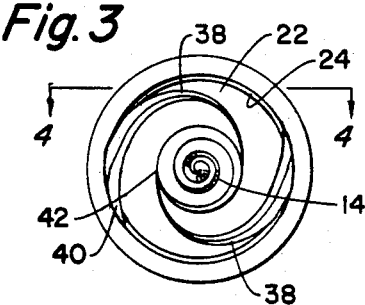
FIG. 3 is a bottom view of another embodiment of the present invention.

Referring to FIG. 3, an alternative embodiment of the present invention is shown in which a plurality of helical ribs 38 are located within the recess 22 and terminate at the outer boundary 24 at the outer end 40 of the helical rib 38. The inner end 42 of the helical rib 38 terminates at the shank 14. It should be understood that while the helical ramp 28 is not shown in FIG. 3 it certainly can be included as part of the embodiment illustrated by FIG. 3. Referring to FIG. 4, the profile of the helical ribs 38 is illustrated to show that the outer end 40 of the helical rib 38 is substantially coequal in height with the depth of the recess 22 at its outer boundary 24. Further, the inner end 42 of the helical rib 38, as shown in FIG. 4, is of minimal height so that the profile of the helical ramp 28 appears as a ramp beginning with minimal height at its inner end 42 and steadily increasing in height to a height substantially coequal with the depth of the recess 22 at its outer boundary 24 at the outer end 40 of the helical rib 38.

Figure 5:
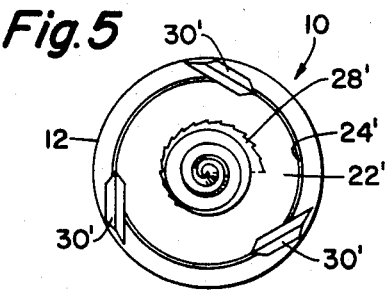
FIG. 5 is a bottom view of yet another embodiment of the fastener of the present invention.
Figure 6:
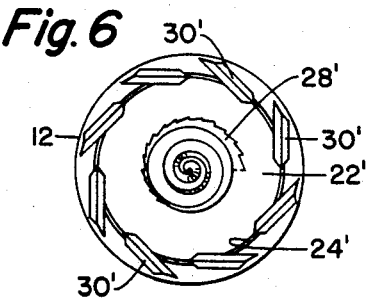
FIG. 6 is a bottom view of still another embodiment of the present invention.

FIGS. 5 and 6 illustrate other embodiments of the present invention wherein the nibs 30' are oriented slightly differently than in FIGS. 1 and 2. In FIGS. 5 and 6 the nibs 30' are arranged substantially perpendicular to radii from the center of the head 12 while still traversing the outer boundary 24' of the recess 22'. The nibs 30' of FIGS. 5 and 6 interact with the upper surface 36 of the first panel 32 to produce a similar raking effect of material from the upper surface 36 as discussed above. As also discussed above, material raked up by the nibs 35 will enter the recess 22' and bind with the helical ramp 28' to significantly increase stripping torque of the fastener 10.

It is to be understood that, while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. A rotary fastener for use in attaching a first panel to a second panel, said fastener comprising a head having an underside and a shank, said shank having at least one helical thread thereon and at least one helical ramp extending along said shank from said underside, said ramp having a generally axially oriented surface which varies in axial length from one end of said ramp to another, said ramp having a generally radially oriented surface of generally increasing radial dimension from one end of said ramp to another and said ramp radially extending surface having a minimum radial extent at a point where said ramp axially oriented surface is at a maximum length, said underside having a generally annular recess defined by inner and outer boundaries, said inner boundary defined by said ramp, said outer boundary defined by a sloping surface which intersects a rim at peripheral portions of said underside, said underside including a plurality of nibs, said nibs traversing said outer boundary.

2. A rotary fastener as recited in claim 1 wherein said nibs traverse said outer boundary substantially radially with respect to the center of said head.

3. A rotary fastener as recited in claim 1 wherein said nibs are substantially perpendicular to a radius with respect to the center of said head.

4. A rotary fastener as recited in claim 1, 2 or 3 wherein said nibs are substantially equally spaced around said heads.

5. A rotary fastener as recited in claim 1 wherein said plurality of nibs are disposed on the underside of said head, said nibs each having a substantial portion thereof disposed on said rim.

6. A rotary fastener for use in attaching a first panel to a second panel, said fastener comprising a head having an underside, a shank with at least one helical thread thereon, a helical ramp adjacent said underside extending along said shank, said ramp having at least one axially oriented surface which varies in axial length from one end of said ramp to another, said ramp having a generally radially oriented surface of generally increasing radial dimension from one end of said ramp to another and said ramp radially extending surface having a minimum radial extent at a point where said ramp axially oriented surface is at a maximum length, said undersurface having at least one protrusion adapted to engage at least one of said panels, and said ramp adapted to cause lateral deformation of at least one of said panels, whereby cooperation of said ramp and said nib prevent stripping of said fastener in said panels.

7. A rotary fastener as recited in claim 6 wherein said ramp has a plurality of axially disposed serrations adapted to engage at least one of said panels.

* * * * *